(12) United States Patent
Moengen

(10) Patent No.: US 8,180,088 B2
(45) Date of Patent: May 15, 2012

(54) HOISTING MECHANISM

(75) Inventor: Christian Moengen, Spikkestad (NO)

(73) Assignee: Cisco Technology, Inc., San Jose, CA (US)

( * ) Notice: Subject to any disclaimer, the term of this patent is extended or adjusted under 35 U.S.C. 154(b) by 1183 days.

(21) Appl. No.: 11/957,910

(22) Filed: Dec. 17, 2007

(65) Prior Publication Data
US 2008/0157548 A1    Jul. 3, 2008

(30) Foreign Application Priority Data

Dec. 22, 2006  (NO) .................................... 20065998

(51) Int. Cl.
*H01L 21/02* (2006.01)
(52) U.S. Cl. ...................................... 381/361
(58) Field of Classification Search ................... 381/361
See application file for complete search history.

(56) References Cited

U.S. PATENT DOCUMENTS

| | | | |
|---|---|---|---|
| 2,836,912 A | 6/1958 | Ranucci | |
| 4,086,132 A * | 4/1978 | Meuschke et al. | 376/271 |
| 4,856,765 A | 8/1989 | Kohno et al. | |
| 5,029,795 A | 7/1991 | Dexter | |
| 2006/0012235 A1 | 1/2006 | Chen | |
| 2011/0161054 A1 * | 6/2011 | Woolf et al. | 703/1 |

FOREIGN PATENT DOCUMENTS

| | | |
|---|---|---|
| DE | 651 642 | 10/1937 |
| DE | 43 05 565 A1 | 8/1994 |
| DE | 100 26 178 A1 | 2/2001 |
| DE | 298 24 998 U1 | 5/2004 |
| FR | 1 127 764 A | 12/1956 |

* cited by examiner

*Primary Examiner* — Thao Le
(74) *Attorney, Agent, or Firm* — Oblon, Spivak, McClelland, Maier & Neustadt, L.L.P.

(57) ABSTRACT

An elevatable microphone support for an audio or videoconferencing system, including: a hoisting mechanism, which includes a base section and a top/crown section, wherein the base section includes a first circular member and a second circular member, the first circular member and the second circular member are concentric with each other, and the first circular member is freely rotatable with respect to the second circular member or the second circular member is freely rotatable with respect to the first circular member, the top/crown section includes a third circular member, and the base and the top/crown section are joined by two or more pairs of links, a first half of said two or more pairs of links are connected to said first circular member, and a second half of said two or more pairs of said links are connected to said second circular member, and all said two or more pairs of links are connected to said third circular member, by revolving joints.

18 Claims, 2 Drawing Sheets

HOISTING MECHANISM

FIELD OF INVENTION

The present invention discloses a hoisting mechanism, such as a hoisting mechanism for use with multimedia equipment.

TECHNICAL BACKGROUND

In order to have a meeting involving participants not located in the same area, a number of technological systems are available. These systems may include video conferencing, web conferencing and audio conferencing.

The most realistic substitute for real meetings is high-end video conferencing systems. Conventional video conferencing systems comprise a number of endpoints communicating real-time video, audio and/or data streams over WAN, LAN and/or circuit switched networks. The endpoints include one or more monitors, cameras, microphones and/or data capture devices and a codec. Another widely used substitute for real meetings is audio conferencing systems.

In all conferencing systems, good audio quality is crucial. Even though visual communication provides important information like body language and design features of objects, the audio signal is still the most important information carrier in conferencing. Poor audio quality can be both annoying to the participants and result in loss of important information, resulting in misunderstandings and miscommunication. To ensure good sound it is imperative that the sound is carried from a person to the microphone with as little disturbance as possible.

Laptop computers are now commonly used for showing presentations, and more and more people are exchanging the traditional pen and paper with laptop computers for taking notes when in meetings. This can create problems if the meeting is held using audio or video conference equipment. Open screens on laptop computers often block the table microphones and make it difficult for the microphones to pick up the sound from the meeting participants. Other objects on the meeting room table may also contribute to distorted sound if placed near or in front of the microphone, e.g. cups, soda bottles, mugs, piles of paper, etc.

The problem mentioned above can be solved by having the microphone mounted on a regular microphone stand. However, this would not be very aesthetic and it could easily get knocked over by the cleaning personnel, craftsmen or meeting attendants, causing damage to the microphone. Another approach is to provide all of the meeting participants with small microphones on their collars. This may require a lot of microphones and is not always practical due to positioning, fastening, and wiring.

BRIEF DESCRIPTION OF THE OBJECT OF THE INVENTION

The aim of the invention is to provide a microphone stand solving the above-mentioned problems in prior art.

One object of the invention is to provide a hoisting mechanism for microphones, which can bring the microphone from a collapsed position to an operating position, elevated above obstructions, providing a direct line between mouth and microphone.

SUMMARY OF THE INVENTION

The objects of the inventions are met by a hoisting mechanism as defined in the enclosed independent claim.

Preferred embodiments and alternative features are defined in the dependent claims.

BRIEF DESCRIPTION OF THE DRAWINGS

The present invention will be described in detail with reference to a preferred embodiment as shown in the following drawings.

DETAILED DESCRIPTION OF THE INVENTION

Figure 1:
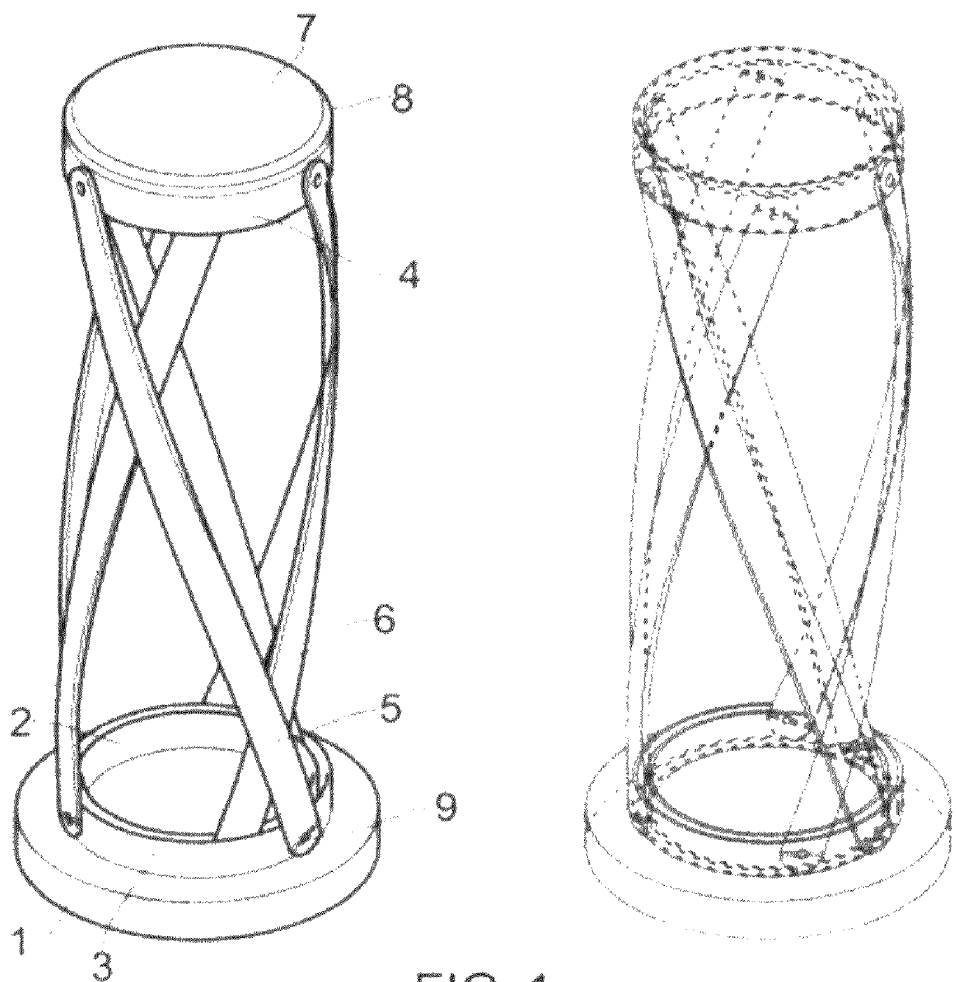
FIG. 1 is a perspective view of the hoisting mechanism according to the invention in an expanded position.
Figure 2:
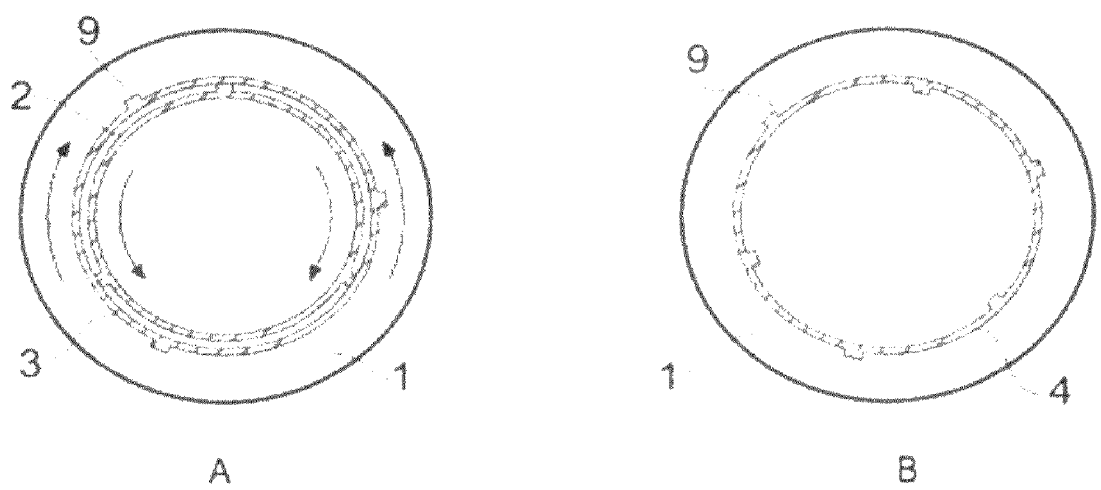
FIG. 2a is a schematic view of the base section of the hoisting mechanism according to the present invention.
FIG. 2b is a schematic view of the top section of the hoisting mechanism according to the present invention.
Figure 3:
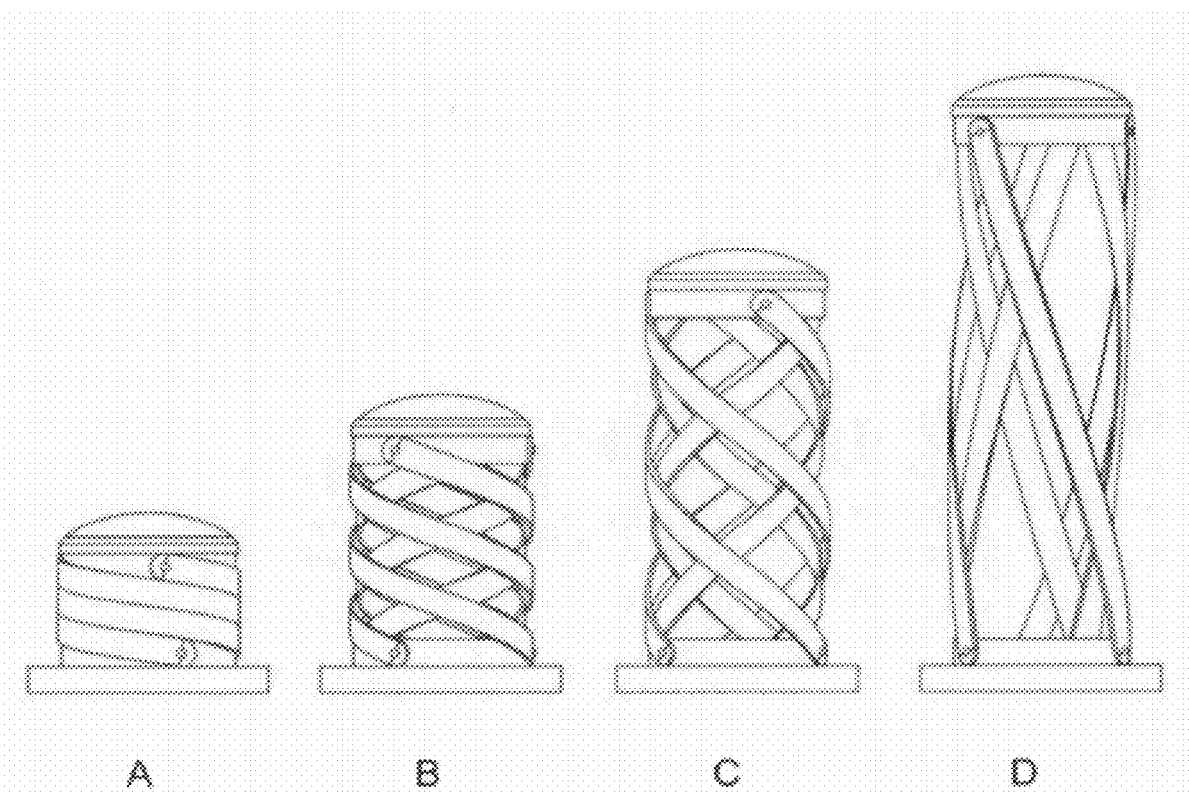
FIG. 3 is a perspective view of the hoisting mechanism showing different positions in side-view.

A hoisting mechanism according to the present invention is shown in FIG. 1. The hoisting mechanism comprises two main modules; a base (1) and a top-section (8). The base supports two concentric circular members or rings (2 and 3) with three or more flexible links (5 and 6) pivotally connected to each ring. There is one inner (6) and one outer (5) set of links, where the inner (6) set is pivotally connected to an inner ring (2) and the outer (5) set is pivotally connected to an outer ring (3). A ring (4) at the top is connected to all of the flexible links with rotary joints (9).

In an embodiment, the rotary (revolving, pivotal) joints are equally spaced around their corresponding ring.

The concentric rings (2 and 3) are free to rotate on the base (1). When the two rings are rotated in opposite directions, the flexible links (5 and 6) will force the top ring (4) to move up or down depending on the direction of which the concentric rings are turned.

In an alternative embodiment, the inner ring (2) is attached to or is part of the base while the outer ring (3) is free to rotate.

In still another embodiment, the outer ring (3) is attached to or is part of the base while the inner ring (2) is free to rotate.

An object (7) can be placed or attached on top of and/or in the top ring (4) and be moved to the desired height by the mechanism.

The flexible links are spiralled around the hoisting axis, where the hoisting axis typically is the axis running through the centre (of mass) of the rings (2, 3) in the base (1) and the ring (4) in the top-section (8). The outer set of links (5) is spiralled in the opposite direction of inner set of links (6). Consequently, when the two bottom rings are rotated in opposite directions, the top-section (8) and the base (1) are pushed apart or pulled towards each other, depending on the direction of rotation of the two bottom rings (2, 3).

The mechanism has a limited working range. The links require a minimum initial angle relative to the base in order for the vertical component of the force to be large enough to overcome friction in the joints and the weight of the object to be lifted. If the object is raised to maximum elevation the links will be parallel and the system is less stable. Hence the angle between the links and the base should be variable between a minimum angle which is larger than 0 degrees and a maximum angle which is less than 90 degrees for the mechanism to work properly.

In an embodiment, the minimum angle is in the range 10 to 30 degrees, and the maximum angle is in the range 60 to 80 degrees.

Suitable blocking members (not illustrated) may be arranged on the rings and/or on the links in order to prevent the relative movement between the links and the base (as well as the top) to exceed the desired angle range.

Several parameters can be changed to obtain different characteristics of the mechanism. The number, length, width, thickness, material, and stiffness of the links influence the range, rigidity, and appearance of the lifting mechanism. Using only two pairs of links will create an unstable system when the joints on the inner and outer rings are close to each other. Therefore, preferably three or more pairs of links are used.

In the illustrated embodiment, 3 pairs of links are used. In an alternative embodiment, 4 pairs of links are used. In another alternative embodiment, 5 pairs of links are used. In still another alternative embodiment, 6 or more pairs of links are used.

Increasing the diameter of the concentric rings (2, 3, 4) allows more space for the links and requires less flexible links for lowering the mechanism. Further, different diameter of the top and bottom rings can be advantageous in the lower positions, because the links can be coiled up inside each other instead of on top of each other. Also, it produces a different visual appearance.

The operation of the hoisting mechanism can be motorized. A bidirectional motor can be used to propel the mechanism if connected to one or both of the bottom rings. The motor is provided to engage with one or both of said inner ring (2) and outer ring (3) in such a way that the inner ring (2) and the outer ring (3) rotate in opposite directions when the motor is operating.

Alternatively, the operation of the hoisting mechanism is manual.

In order to avoid a collapse of the hoisting mechanism when loaded by an object, a frictional member or a locking member may be arranged between the inner ring (2) and the outer ring (3). This is particularly useful in the case of manual operation, but it may also be applied in the motorized embodiment of the hoisting mechanism.

The links must be flexible in such a way that they can be bent into a ring or spiral. Further, the links must also be able to flex when exposed to a torsion force. However, the materiel in the links can not be of such nature that the links become permanently deformed when bending them. The links must be able to automatically regain their original form when applied forces are removed, even after being deformed for a long time. A suitable material for the links is spring steel. Alternative materials for the links include synthetic materials such as pvc, vinyl, nylon, etc., and may be readily selected by the skilled person in accordance with the desired properties indicated above.

Examples of suitable materials for the base, the rings and the top section are metals such as steel, aluminium and various alloys, and synthetic materials such as reinforced plastics or thermoplastics.

According to one exemplary embodiment of the present invention, the mechanism is used for elevating a microphone in a tabletop audio or video conferencing device. The microphone may be placed in or on the top ring (4), or the top ring is a part of the microphone assembly, and the base can contain a speaker and various control buttons. To provide obstruction free hoisting of the microphone, the microphone could have a wireless connection to the base (1), or the cable connection the microphone to the electronics in the base could be integrated into one of the links.

The mechanism according to the present invention can be used for elevating or change the position of any thinkable object, of reasonable size and weight. The mechanism can e.g. be used as a focusing mechanism in a lens system, for changing the position of a camera (e.g. web-camera) or to reveal the camera from a hidden position, for elevating a light source or its shade/filter, etc.

The hoisting mechanism according to the present invention is a functional way to elevate a microphone above obstructions to create a direct path between a speaker's mouth and the microphone. When used as a microphone support in a audio or videoconferencing system, the hoisting mechanism according to the invention involves additional, advantageous acoustic effects, including impact-absorbing and/or shock-attenuating properties.

When not in use, the microphone simply lowers onto or into its base and out of the way. It opens up for a variety of interesting designs and will most likely draw attention.

The invention claimed is:

1. An elevatable microphone support for an audio or videoconferencing system, comprising:
    a hoisting mechanism, which includes a base section and a top/crown section,
    wherein the base section includes a first circular member and a second circular member, the first circular member and the second circular member are concentric with each other, and the first circular member is freely rotatable with respect to the second circular member or the second circular member is freely rotatable with respect to the first circular member,
    the top/crown section includes a third circular member, and
    the base section and the top/crown section are joined by two or more pairs of links, a first half of said two or more pairs of links are connected to said first circular member, and a second half of said two or more pairs of said links are connected to said second circular member, and all said two or more pairs of links are connected to said third circular member, by revolving joints.

2. The elevatable microphone support according to claim 1, wherein each of the two or more pairs of link is spiralled around the center axis, and
    said first half of said two or more pairs of links are spiralled in an opposite direction of said second half of said two or more pairs of links.

3. The elevatable microphone support according to claim 1, wherein said two or more pairs of links at all times have an angle, $\alpha$, to the base section, where $0°<\alpha<90°$.

4. The elevatable microphone support according to claim 1, wherein said first circular member has a smaller radius than said second circular member and is located inside said second circular member.

5. The elevatable microphone support according to claim 1, wherein the third circular member is configured to support an object.

6. The elevatable microphone support according to claim 5, wherein said object is a microphone or camera.

7. The elevatable microphone support according to claim 1, further comprising:
    a bidirectional motor that engages with one or both of said first circular member and said second circular member in such a way that said first circular member and said second circular member rotate in opposite directions when said motor is operating.

8. The elevatable microphone support according to claim 1, wherein said revolving joints are equally spaced around said first, second and third circular members.

9. The elevatable microphone support according to claim 1, wherein said third circular member has a same radius as said second circular member.

10. The elevatable microphone support according to claim 1, wherein said third circular member has a different radius than said second circular member.

11. The elevatable microphone support according to claim 1, further comprising:
a microphone disposed in or on the third circular member.

12. The elevatable microphone support according to claim 1, wherein the third circular member is part of a microphone assembly.

13. The elevatable microphone support according to claim 11, wherein the base section includes a speaker and control buttons.

14. The elevatable microphone support according to claim 12, wherein the base section includes a speaker and control buttons.

15. The elevatable microphone support according to claim 11, further comprising a wireless connection between the microphone and the base section.

16. The elevatable microphone support according to claim 11, further comprising a cable connection between the microphone and electronics equipment in the base section, wherein the cable connection is integrated into a link of the two or more pairs of links.

17. The elevatable microphone support according to claim 1, wherein the first circular member and the second circular member are concentric rings.

18. A method comprising:
raising and lowering a microphone with a hoisting mechanism that includes a base section and a top/crown section supporting or housing the microphone,
wherein the base section includes a first circular member and a second circular member, the first circular member and the second circular member are concentric with each other, and the first circular member is freely rotatable with respect to the second circular member or the second circular member is freely rotatable with respect to the first circular member,
the top/crown section includes a third circular member, and
the base and the top/crown section are joined by two or more pairs of links, a first half of said two or more pairs of links are connected to said first circular member, and a second half of said two or more pairs of said links are connected to said second circular member, and all said two or more pairs of links are connected to said third circular member, by revolving joints.

* * * * *